United States Patent [19]
Stumpe et al.

[11] Patent Number: 5,806,938
[45] Date of Patent: Sep. 15, 1998

[54] METHOD AND APPARATUS FOR DETERMINING A CHARACTERISTIC VALUE OF A WHEEL BRAKE

[75] Inventors: Werner Stumpe, Stuttgart; Roland Karrelmeyer, Ditzingen; Juergen Wrede, Bietigheim-Bissingen; Matthias Horn, Hardheim, all of Germany

[73] Assignee: Robert Bosch GmbH, Stuttgart, Germany

[21] Appl. No.: 824,881

[22] Filed: Mar. 26, 1997

[30] Foreign Application Priority Data

Apr. 20, 1996 [DE] Germany .................... 196 15 831.1

[51] Int. Cl.⁶ .................. B60T 13/66; B60T 8/60
[52] U.S. Cl. .................. 303/155; 303/3; 303/15; 303/113.4; 303/166; 303/DIG. 3; 303/DIG. 4
[58] Field of Search ............... 303/3, 113.4, 20, 303/15, DIG. 3, 166, DIG. 4, 115.2, 155, 125, 135, 156, 158; 701/71; 188/195, 156, 159, 162

[56] References Cited

U.S. PATENT DOCUMENTS

| | | | |
|---|---|---|---|
| 4,795,219 | 1/1989 | Brearley et al. | 303/15 |
| 4,971,400 | 11/1990 | Jonner | 303/110 |
| 5,150,951 | 9/1992 | Leiber et al. | 303/186 |
| 5,415,467 | 5/1995 | Utz et al. | 303/89 |
| 5,496,097 | 3/1996 | Eckert | 303/155 |
| 5,615,931 | 4/1997 | Stumpe et al. | 188/195 |
| 5,669,678 | 9/1997 | Stumpe et al. | 303/155 |

FOREIGN PATENT DOCUMENTS

| | | |
|---|---|---|
| 0509225 | 10/1992 | European Pat. Off. . |
| 4332459 | 3/1995 | Germany . |
| 1197737 | 7/1970 | United Kingdom . |
| 8503480 | 8/1985 | WIPO . |
| 9601757 | 1/1996 | WIPO . |

OTHER PUBLICATIONS

Oppelt, "Kleines Handbuch Technischer Regelvorgänge", Verlag Chemie GmbH, Weinheim (1964) pp. 71–73.

*Primary Examiner*—Douglas C. Butler
*Attorney, Agent, or Firm*—Fulbright & Jaworski

[57] ABSTRACT

In a selected operating situation, the automatic control circuit, which is closed during normal operation, is opened, the final control element of the wheel brake being actuated within the scope of an open-loop control process. The drive signal value for the wheel brake changes in accordance with a predetermined time function, and the application pressure or release pressure is found on the basis of the characteristic behavior of a value representing the braking action.

11 Claims, 4 Drawing Sheets

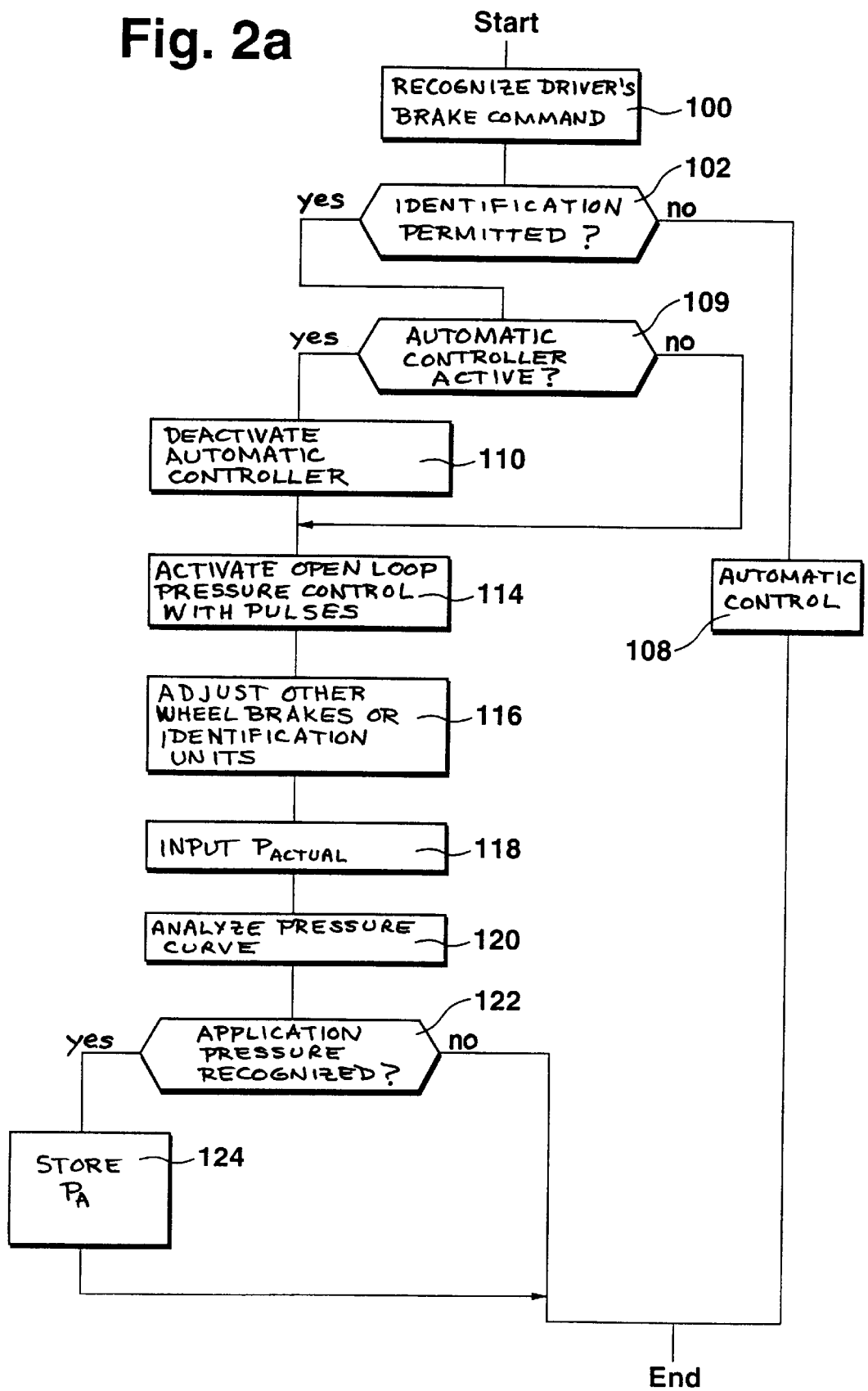

METHOD AND APPARATUS FOR DETERMINING A CHARACTERISTIC VALUE OF A WHEEL BRAKE

BACKGROUND OF THE INVENTION

The invention pertains to a method and to an apparatus for determining a characteristic value of a wheel brake by evaluating at least one variable representing the braking action.

A method and an apparatus of the type in question are known from, for example, EP-A 509,225. This document describes an electrically controlled pneumatic brake system for vehicles, in which the braking pressure in the individual wheel brakes is adjusted by an automatic pressure control circuit as a function of nominal pressure values, these nominal values being derived from the actuation of the brake pedal. To recognize a characteristic value of the wheel brake, namely, the so-called "application" pressure, that is, the pressure which must be exerted to overcome the air gap of the wheel brake, the braking pressure curve is recorded during a braking process, and on the basis of how this pressure increases, an inflection point in the pressure curve is derived, which corresponds to the determined application pressure of the wheel brake. No concrete control measures for recognizing the application pressure, for recognizing the corresponding release pressure, and/or for determining the brake characteristic (the ratio of the braking pressure to the amount of braking force exerted by the wheel brake) are given.

SUMMARY OF THE INVENTION

It is the object of the invention to provide control measures and identification methods for at least one wheel brake, by means of which at least one characteristic value (application or release of the wheel brake, brake characteristic) can be determined reliably.

This is achieved by opening the automatic control circuit in a selected operating situation, and driving the final control element which generates the braking action as part of an open loop control process.

The control measures according to the invention optimize the determination of a characteristic value of a wheel brake. It is especially advantageous to use these control measures to determine the application or release of a wheel brake, because the features necessary for determining this application or release occur in a much more easily recognizable fashion. In a corresponding manner, the control measures are used advantageously to determine a brake characteristic.

Even though the automatic control circuit is opened, conditions critical to safety are nevertheless effectively avoided.

The use of the control measures is especially advantageous in electro-pneumatic or electro-hydraulic brake systems, in which application or release is determined on the basis of the curve of the braking pressure.

The control measures according to the invention minimize the amount of interference with the brake behavior which the driver expects to experience.

Efficient use is made of computing and memory capacity in the determination of the application or release of the wheel brake.

Additional advantages can be derived from the following description of exemplary embodiments.

BRIEF DESCRIPTION OF THE DRAWING

FIGS. 2a and 2b present flow diagrams, which illustrate control according to the invention as a computer program.

DESCRIPTION OF THE EXEMPLARY EMBODIMENTS

Figure 1:
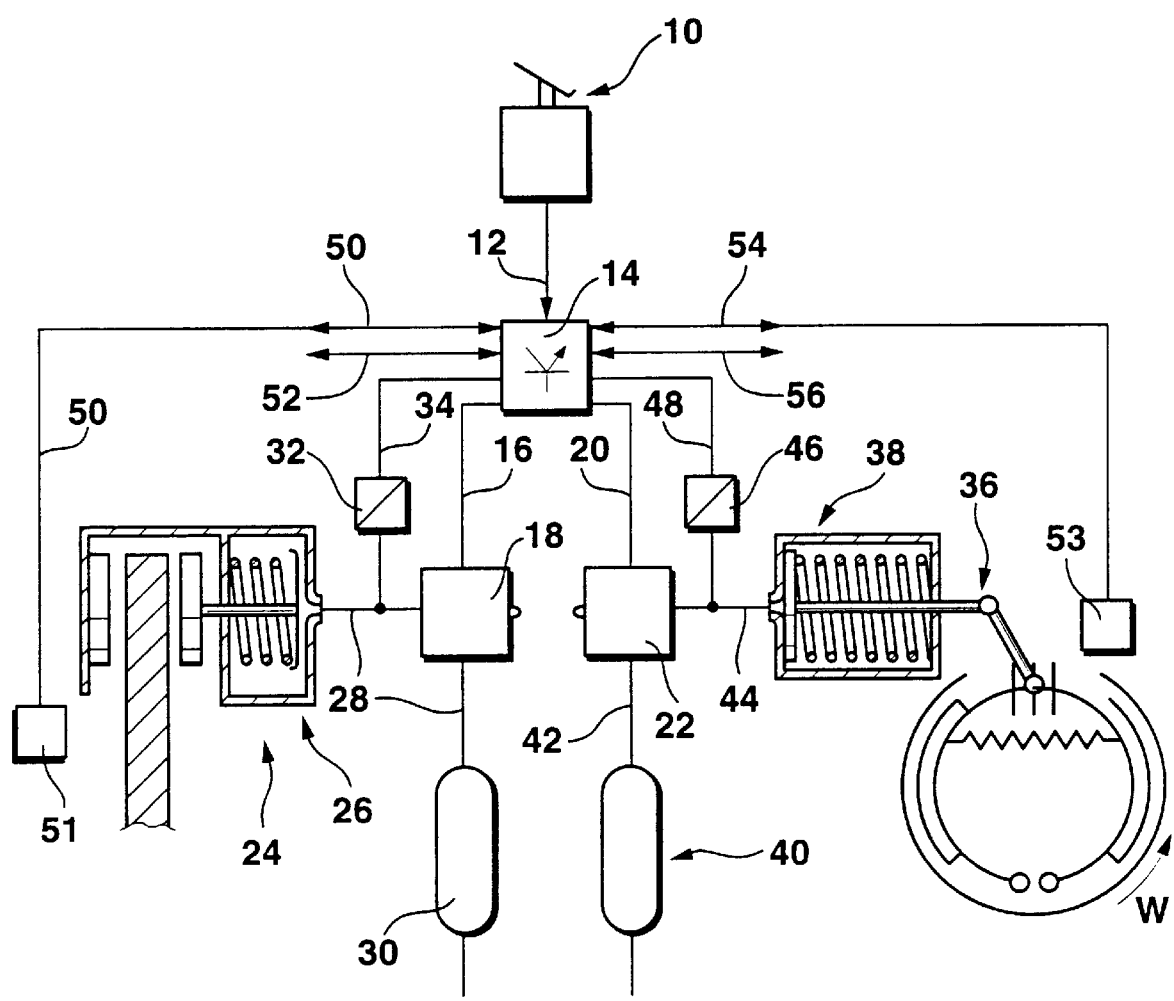
FIG. 1 shows an overall diagram of an electrically controlled brake system.

FIG. 1 shows an overall diagram of an electrically controlled brake system. In the preferred exemplary embodiment, this brake system also encompasses emergency or auxiliary brake circuits of a pneumatic or hydraulic nature, which are not shown in FIG. 1 for the sake of clarity. FIG. 1 does show a braking value sensor 10, which can be actuated by the driver, and which is connected by a line 12 to an electronic control unit 14. Electronic control unit 14 is connected by a line 16 to a first pressure control valve 18 and by a line 20 to a second pressure control valve 22. In the preferred exemplary embodiment, pressure control valve 18 controls the pressure produced in brake cylinder 26 of a disk brake 24 by way of a hydraulic or pneumatic line 28. The pressure in line 28 and therefore the braking pressure is detected by a pressure sensor 32, which is connected by a line 34 to electronic control unit 14. By way of a line 50, electronic control unit 14 is connected to a rotational speed sensor 51, which measures the rotational speed of the wheel assigned to brake 24. In an analogous manner, pressure control valve 22 controls the input of pressure from a reservoir 40 into brake cylinder 38 of a drum brake 36 via pneumatic or hydraulic lines 42, 44. A pressure sensor 46 detects the pressure in line 44 or brake cylinder 38. Pressure sensor 46 is connected by a line 48 to electronic control unit 14. To detect the rotational speed of the wheel assigned to brake 36, a rotational speed sensor 53 is provided, which is connected by a line 54 to electronic control unit 14. Additional output and input lines 52, 56 of electronic control unit 14 are also shown, over which additional operating variables of the vehicle or of the brake system are sent to the control unit and/or over which the electronic control unit controls the brakes of other wheels or axles.

The design of the brake system described above with both disk and drum brakes is intended to serve as an example. In other exemplary embodiments, the brake system can be equipped either entirely with disk brakes or entirely with drum brakes. In one exemplary embodiment, the pressure control valves are assigned to one of the axles of the vehicle; in other exemplary embodiments, they are assigned to the individual wheel brakes. In place of the electro-pneumatic or electro-hydraulic brake system, it is also possible to provide a purely electrical brake system. A part of electronic control unit 14 and/or pressure sensors 32, 46 can also be integrated into pressure control valves 18, 22. Pressure control valves 18, 22 would then communicate over a data bus with electronic control unit 14. In the case of a purely electrical brake system, pressure control valves 18, 22 would be electrical brake actuators such as d.c. motors, which produce the force necessary to actuate the brakes.

To initiate a braking process, the driver actuates brake value sensor 10. This value converts the actuation value and/or the actuating force into an electrical signal, which is sent to electronic control unit 14. Whenever the degree to which the brake value sensor is actuated exceeds a predetermined threshold value, the system concludes that the driver wants to brake, and the pressure control valves are then driven by electronic control unit 14. In the case of a pneumatic brake system, these valves allow air to pass from the supply reservoirs to brake cylinders 26, 38. The braking pressure level thus reached is also monitored by pressure sensors 32, 46, and the pressure value actually produced is transmitted to electronic control unit 14. If the pressure is higher than that wanted by the driver, pressure reduction pulses are transmitted by the control unit; if the pressure value is too low, pressure buildup pulses are transmitted. The length or number of the pressure buildup or pressure reduction pulses are handled by the electronic control unit as part of an automatic control circuit in such a way that the pressure in the wheel brake is adjusted until it matches a nominal value derived from the actuation value of the brake pedal. In other advantageous exemplary embodiments, electronic control unit 14 can also automatically control the braking torque, the braking force, the deceleration of the vehicle, the velocity of the wheels, the slip, etc., so that they match a predetermined nominal value. In closed-loop controls of this sort, the nominal value in question (deceleration, braking pressure, braking torque, wheel velocity, slip, etc.) is determined as a function of the degree of actuation of brake value sensor 10 by means of predetermined characteristic curves or diagrams. Depending on the type of automatic control in question, it is also possible for the brake control to take into account axle loads, brake temperature, tire-road adhesion, the slip between the wheels of the vehicle and the road, etc.

So that the brake system and the braking process can be implemented satisfactorily, it is desirable to know certain characteristic values for each wheel brake or axle; such a value is, for example, the actuating variable (e.g., pressure, distance, etc.) at which the braking action actually begins in the wheel brake itself or at the axle itself. This is especially true in the case of articulated combinations of vehicles, where it is desirable for the tractor and the trailer to be braked to the same extent so as to minimize the longitudinal forces. In particular, it is desirable to avoid any offset in the times at which the braking action begins at the individual wheel brakes. It is therefore necessary to determine when the wheel brakes are applied and when they are released. It is also desirable to know the so-called "brake characteristic". This describes the relationship between the braking pressure and the braking force actually exerted. It is derived from braking pressure values and the deceleration values of the vehicle.

In the preferred exemplary embodiment, the application and release of the wheel brake are derived from the curve of the braking pressure signal versus time according to the technique described in WO 96/01757, which corresponds to U.S. application Ser. No. 08/596,259, incorporated herein by reference.

Here the following strategy is followed: At the beginning of a normal braking process, under monitoring to avoid safety-critical situations, the automatic control circuit, which is closed under normal conditions (in the preferred exemplary embodiment, an automatic pressure control circuit), is opened. The final control device of the wheel brake is then driven effectively so as to increase the pressure (or to decrease the rotational speed) from an original value. The pressure (or rotational speed) produced by the final control device is detected continuously and sent to an identification device. This device uses a predefined strategy to determine when application of the wheel brake has occurred. After a successful identification or after a termination of the process as required by circumstances, the open control circuit is switched to closed loop control again, the transition being controlled by the specification of certain transfer functions, which are generated by appropriate mathematical models. In a preferred exemplary embodiment, a model with PT1 behavior is used. Such a model is disclosed in Oppelt, "Kleines Handbuch Technischer Regelvorgänge", Verlag Chemie GmbH, Weinheim (1964) at pp. 71 to 73.

corresponding procedure is used to determine the release of the wheel brake. The release is identified on the basis of a pressure reduction, also produced under controlled conditions.

The identification procedure described above is initiated at selected wheel brakes, the brake behavior expected by the driver being influenced to only a minimal extent, and safety-critical situations avoided. The driving conditions with respect to deceleration are monitored during the entire identification phase. An initiated identification process is immediately terminated if a safety-critical driving situation occurs (e.g., ABS/ASR becomes active, excessive pressure difference between right and left wheel brakes, etc.). During the identification process, the final control elements are released and blocked in a controlled manner. Release or blocking occurs as a function of a selected strategy, according to which the open-loop control to which each wheel brake is subjected is initiated after the expiration of a predetermined time, after a predetermined number of braking processes, or in the event of an appropriate actuation of the brake pedal.

Depending on the final control devices used, the braking force produced under open-loop control can be built up and reduced on a linear ramp, on a nonlinear ramp, or in cycles with pulses of predetermined duration. The type of open-loop control is variable as a function of changes in the brake system and/or of the driver's braking requirements. During the active identification phase, the type of open-loop control remains unchanged (e.g., the pulse specification). The control (pulse specification: frequency and/or pulse duration) can be adapted between one braking and another.

Various methods for recognizing the inflection point in the pressure curve are used to determine the occurrence of application or release. Recursive or nonrecursive methods are conceivable. The use of recursive methods is especially advantageous, because then the identification can be terminated as soon as the inflection point has been identified. See, e.g., WO96/01757.

Figure 2B:
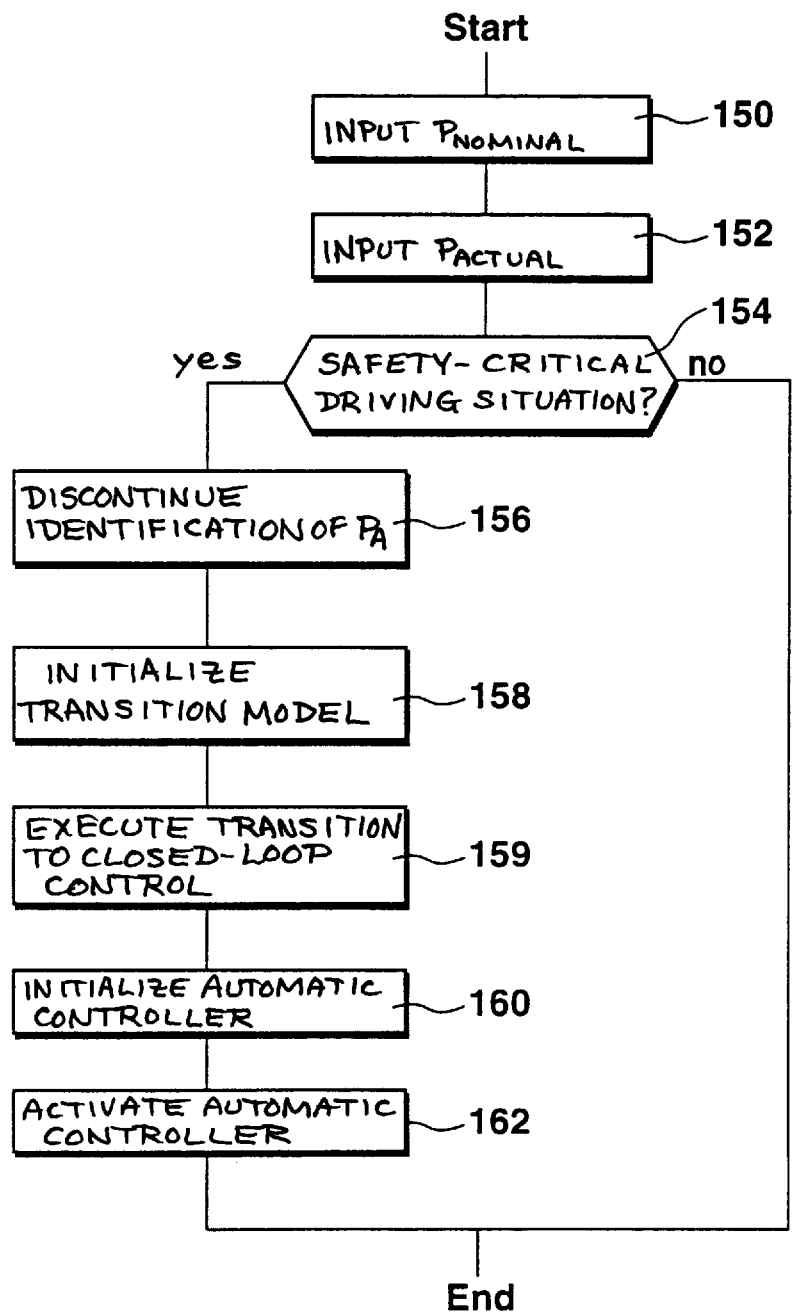

A preferred embodiment of the identification process, in which application is identified on the basis of the braking pressure curve, is illustrated by the flow charts in FIGS. 2*a* and 2*b* for an electro-pneumatic brake system. These flow charts represent programs, which run on a microcomputer in the electronic control unit, and which are initiated at predetermined time intervals (every few milliseconds).

The first job which the program according to FIG. 2*a* performs after it starts is to detect the driver's braking command (e.g., from a brake pedal switch, etc.). This is done in the first step 100. Then, in test step 102, the program checks to see whether an identification process is permitted (see FIG. 2*b*). When, for example, the application or release pressure is to be determined (e.g., after expiration of a predetermined operating time since the last successful determination when the driver wishes only to brake gently, etc.), identification is initiated as soon as a braking of the desired type begins (upon recognition of the braking command). If identification is not permitted, automatic control is active (step 108). A drive signal value (e.g., the duration or the number of pulses to be transmitted) is determined for each wheel brake or for groups of wheel brakes according to the predetermined control strategy as a function of the difference between the nominal and the actual pressure values. The subprogram ends at this point and starts again after the predetermined interval.

If identification is permitted, the program checks in step 109 to see whether the automatic controller is active. If it is, the automatic controller is deactivated in step 110 (that is, the closed-loop control circuit is opened), and in the following step 114, open-loop pressure control is activated. If it has been found in step 109 that the automatic controller is not active, step 114 follows directly. During open-loop control, pressure is built up in a wheel brake or identification unit to determine when brake application occurs, or pressure is reduced when it is desired to determine when the release of the brake occurs. In the preferred exemplary embodiment, this is done by the transmission of pulses of predetermined duration and/or frequency, which are constant over the course of one identification phase. After the activation of the open-loop pressure control of selected identification units in step 114, the other wheel brakes or identification units, of the vehicle are influenced correspondingly in an advantageous exemplary embodiment in step 116. For example, to achieve the same braking action, the wheel brakes of the other axle are braked somewhat more strongly, whereas the wheel brake of the same axle is actuated in the same way as the wheel brake whose application pressure is to be identified. Then, in step 118, the actual pressure value $P_{actual}$ is accepted as input; and, in step 120, the pressure curve is analyzed on the basis of this actual pressure value and the actual pressures determined during previous runs of the program. If an extreme value is found in the pressure gradient, it is assumed that application of the wheel brake has occurred (step 122). In this case, the pressure necessary for this to happen is stored as the application pressure $P_A$ in step 124. After step 124, as also in the case of a "no" answer in step 122, the subprogram ends and is repeated at the given time.

To determine the release of a wheel brake, a corresponding open-loop control of the wheel brake to be identified is undertaken when the driver lets go of the brake pedal. The pressure signal is evaluated in the same way as that used to recognize brake application.

FIG. 2b shows a program for monitoring the identification process and for handling the transition. This program, too, is started at predetermined time intervals as the program according to FIG. 2a is running.

In the first step 150, the nominal pressure value $P_{nominal}$ determined in another subprogram as a function of the actuation of the brake pedal is accepted as input. In the following step 152, the actual pressure value $P_{actual}$ is read in. Then, in step 154, the program checks to see whether identification is permitted, that is, whether a safety-critical driving situation is present. If no such situation is present, identification is permitted and the program is terminated.

If a safety-critical driving situation is present, the current identification is discontinued in step 156, and the automatic control circuit is closed again. In step 158, a transfer function is introduced to handle the transition from open-loop control to closed-loop control and is executed in step 159. For example, to avoid an abrupt change in the pressure, a filter element with PT1 behavior is used for this transition. In step 160, the automatic controller is initialized (loaded with parameters, by means of which the controller first determines the preceding output signal), and then the automatic controller is activated in step 162. Automatic control now proceeds in the known manner, and the program terminates.

Figure 3A:
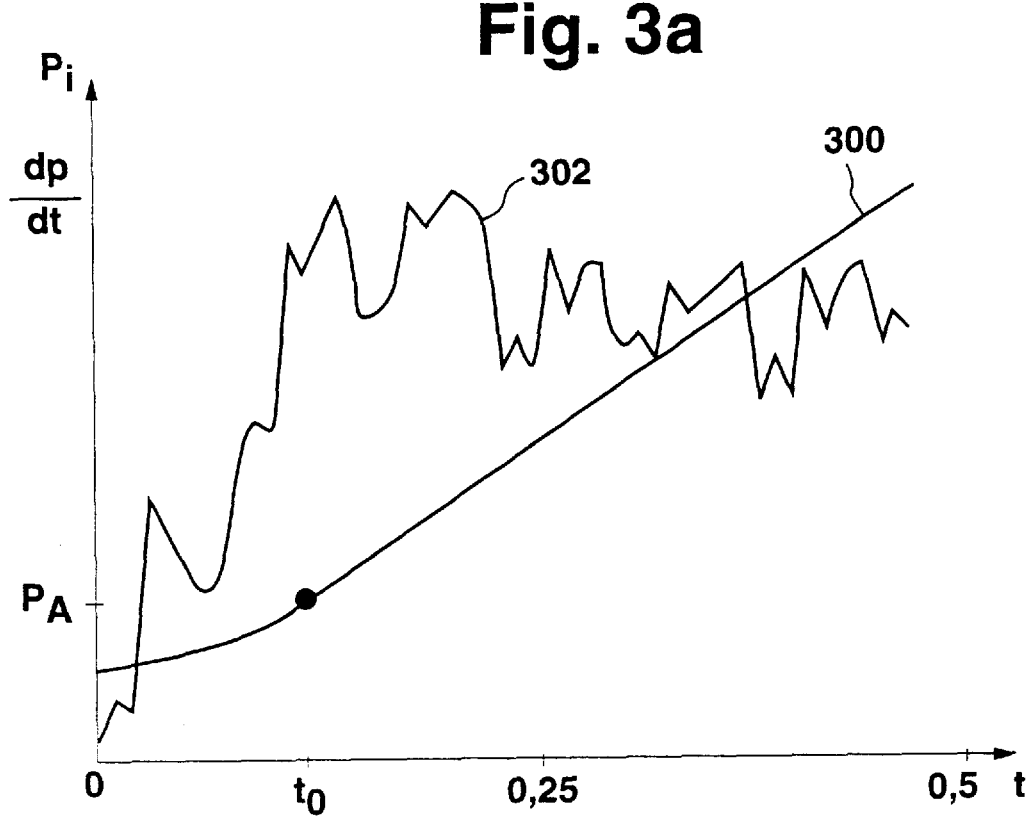
FIG. 3a is a graph illustrating the rate of change in brake pressure over time.
Figure 3B:
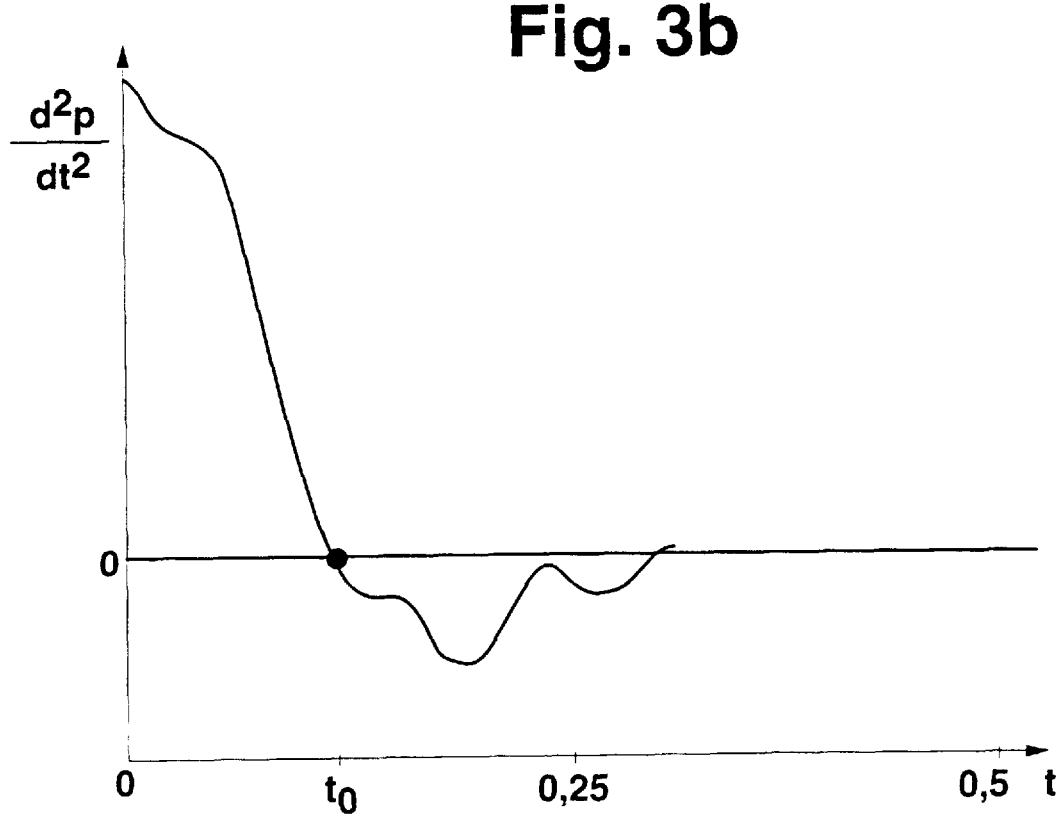
FIG. 3b illustrates the time duration of the parameter illustrated in FIG. 3a, which identifies the application of the wheel brake.

FIGS. 3a and 3b shows typical signal curves. FIG. 3a shows the curve of the brake pressure versus time (300) and the curve of the brake pressure gradient (302). In a corresponding manner, FIG. 3b shows the second derivative with respect to time of the brake pressure, that is, the local slope of the gradient curve. This represents one of the possible ways of detecting extreme points in the pressure gradient curve. It is determined by local regression lines, which are determined with each run-through of the program on the basis of the current and previous gradient values.

The driver actuates the brake pedal at time T=0, so that the open-loop control process according to the invention begins at time T=0. Then the braking pressure increases as shown by curve 300. The gradient of the braking pressure and its derivative with respect to time change in a corresponding manner. At time $t_0$, the derivative with respect to time of the brake pressure gradient falls below the zero line for the first time; that is, the change in the determined braking pressure gradient is negative. Experience has shown that this is a sign that the brake has been "applied". In a corresponding manner, the pressure value present at time $t_0$ or a pressure value derived therefrom is stored as the application pressure $P_A$.

The determined application pressure serves as an offset value in the determination of the nominal braking pressure values for the individual brakes; as a result, it can be guaranteed that application will occur simultaneously at all wheel brakes when the brake pedal is actuated. A similar procedure is used to determine the release pressure. Here again, the slope of the brake pressure gradient is determined as an average value, and its typical change over time is evaluated to determine the release pressure. The release pressure is treated here as a negative offset.

We claim:

1. Method for operating a wheel brake of a vehicle having a brake system operatively associated with said wheel brake, said vehicle having a brake pedal configured to be actuated by a driver to varying degrees, said method comprising:

measuring the degree to which the driver actuates the brake pedal, automatically controlling braking action in a closed loop as a function of the degree to which the driver actuates the brake pedal, said automatic control being effected by an automatic control circuit, opening said loop in a selected operating situation so that open loop control of said brake system is effected, detecting at least one variable representing braking action during said open loop control, determining a characteristic value of said wheel brake by evaluating said at least one variable representing braking action during said open loop control, said characteristic value being one of application pressure and release pressure, and driving a final control element to generate said braking action based on said characteristic value.

2. Method according to claim 1 wherein the final control element is driven by a drive signal value which is constant over the course of an identification process.

3. Method according to claim 2, wherein the drive signal value is changed between one braking and another.

4. Method according to claim 1 wherein the wheel brake is part of an electrically controlled pneumatic or hydraulic brake system, and the automatic control circuit automatically regulates the brake pressure in the wheel brake.

5. Method according to claim 1 wherein the automatic control circuit automatically controls at least one of vehicle deceleration, braking torque, braking force, wheel speed, and wheel slip.

6. Method according to claim 1 wherein the characteristic value is determined from at least one of a characteristic course of the braking pressure and a rotational speed of the wheel.

7. Method according to claim 6 wherein an average course of the gradient of the variable is determined, and in that the application or release of the wheel brake is recognized when the pressure gradient assumes extreme values.

8. Method according to claim 1 wherein the selected operating situation is one in which the driver actuates the brake pedal to initiate a braking process, during which the determination of the application of a wheel brake does not result in any safety-critical situations.

9. Method according to claim 1 wherein the determination of the application or release of the wheel brake is initiated after a predetermined operating time, after a predetermined number of braking processes, as a function of the idle time of the vehicle, or when changes have occurred in braking behavior of the vehicle.

10. Method according to claim 1 wherein the application of release of the wheel brake of the vehicle is determined individually for each indentification unit.

11. Apparatus for operating a wheel brake of a vehicle having a brake system operatively associated with the wheel brake, said vehicle having a brake pedal configured to be actuated by a driver to varying degrees, said apparatus comprising:

means for measuring the degree to which the driver actuates the brake pedal, an automatic control circuit which automatically controls braking action in a closed loop as a function of the degree to which the driver actuates the brake pedal, means for opening said loop in a selected operating situation so that open loop control of said brake system is effected, means for detecting at least one variable representing braking action during open loop control, means for determining a characteristic value of a wheel brake by evaluating said at least one variable representing braking action during said open loop control, said characteristic value being one of application pressure and release pressure, and means for driving a final control element to generate said braking action based on said characteristic value.

* * * * *

UNITED STATES PATENT AND TRADEMARK OFFICE
CERTIFICATE OF CORRECTION

PATENT NO. : 5,806,938
DATED : September 15, 1998
INVENTOR(S) : Stumpe, et al.

It is certified that error appears in the above-identified patent and that said Letters Patent is hereby corrected as shown below:

In <u>column 4, line 8,</u> insert - - A - - at the beginning of the sentence, before "corresponding."
In <u>column 5, line 20,</u> delete - - , - - after the word "units".

Signed and Sealed this

Thirteenth Day of June, 2000

Attest:

Q. TODD DICKINSON

*Attesting Officer*     *Director of Patents and Trademarks*